(12) United States Patent
Wang et al.

(10) Patent No.: US 9,331,941 B2
(45) Date of Patent: May 3, 2016

(54) TRAFFIC FLOW REDIRECTION BETWEEN BORDER ROUTERS USING ROUTING ENCAPSULATION

(71) Applicant: Cisco Technology, Inc., San Jose, CA (US)

(72) Inventors: Xiaorong Wang, Shanghai (CN); Dapeng Liu, Shanghai (CN); Hunan Cao, Shanghai (CN); Hongbo Xia, Shanghai (CN)

(73) Assignee: Cisco Technology, Inc., San Jose, CA (US)

( * ) Notice: Subject to any disclaimer, the term of this patent is extended or adjusted under 35 U.S.C. 154(b) by 134 days.

(21) Appl. No.: 13/964,244

(22) Filed: Aug. 12, 2013

(65) Prior Publication Data

US 2015/0043348 A1 Feb. 12, 2015

(51) Int. Cl.
*H04L 12/741* (2013.01)
*H04L 12/803* (2013.01)
*H04L 12/721* (2013.01)
*H04L 12/715* (2013.01)

(52) U.S. Cl.
CPC .............. *H04L 45/745* (2013.01); *H04L 45/38* (2013.01); *H04L 47/125* (2013.01); *H04L 45/04* (2013.01); *H04L 45/74* (2013.01)

(58) Field of Classification Search
CPC ....................................................... G06F 11/00
See application file for complete search history.

(56) References Cited

U.S. PATENT DOCUMENTS

| 2008/0151746 A1* | 6/2008 | Vasseur et al. ................ 370/228 |
| 2011/0228785 A1 | 9/2011 | Filsfils et al. |
| 2012/0020224 A1 | 1/2012 | Vasseur et al. |
| 2012/0183000 A1* | 7/2012 | Vasseur et al. ................ 370/401 |
| 2013/0051224 A1 | 2/2013 | Vasseur et al. |

OTHER PUBLICATIONS

Dommety, "Key and Sequence Number Extensions to GRE," The Internet Society, Network Working Group, Standards Track, Request for Comments: 2890, Sep. 2000, pp. 1-7.

* cited by examiner

*Primary Examiner* — Marcus R Smith
*Assistant Examiner* — Omeed D Rahgozar
(74) *Attorney, Agent, or Firm* — Edell, Shapiro & Finnan, LLC

(57) ABSTRACT

In response to receiving one or more packets from an interface, an anchoring border router classifies the traffic flow and either transmits the packets based upon the routing control table as usual, or determines that the packets of the traffic flow are to be forwarded to a forwarding border router. Upon determining that the packets are to be forwarded, the packets are encapsulated with a routing encapsulation key corresponding to a routing path and are forwarded from the anchoring border router to the forwarding border router via a routing encapsulation tunnel. When a forwarding border router receives the redirected packets over the routing encapsulation tunnel, the forwarding border router removes the routing encapsulation key from the packets of the traffic flow and transmits the packets via a routing path corresponding to the routing encapsulation key.

20 Claims, 12 Drawing Sheets

US 9,331,941 B2

TRAFFIC FLOW REDIRECTION BETWEEN BORDER ROUTERS USING ROUTING ENCAPSULATION

TECHNICAL FIELD

The present disclosure relates to management of traffic flows between networking devices.

BACKGROUND

In a networking environment, such as a datacenter or cloud environment, application performance based wide area network (WAN) path optimization is employed to optimize communication, for example, from cloud-to-cloud or cloud-to-Internet environments. In such a deployment, a central policy server (PS) collects performance information regarding traffic flows and WAN exit link usage reported from each border router under its control. Based on this information, the policy server makes routing decisions for traffic flows and redirects traffic flows among border routers to improve performance, perform load sharing, and improve failure tolerance.

DESCRIPTION OF EXAMPLE EMBODIMENTS

Overview

Techniques are provided for managing traffic flows in a network environment. These techniques may be embodied as a method, apparatus or instructions in a non-transitory computer readable storage media. One or more traffic flows may be routed or rerouted over a network to optimize performance characteristics of the network. At a first border router, one or more packets are received (e.g., from a LAN) and classified as corresponding to a first traffic flow of a plurality of traffic flows. The border router determines whether the packets of the first traffic flow are to be forwarded to a second border router based on a routing control table that establishes an association between the plurality of traffic flows and respective routing paths. In response to determining that the packets of the first traffic flow are to be forwarded to the second border router, the one or more packets of the first traffic flow are encapsulated with a routing encapsulation key indicated by the routing control table, wherein the routing encapsulation key corresponds to a first routing path. Once encapsulated, the packets of the first traffic flow are forwarded via a routing encapsulation tunnel from a first border router to a second border router for transmission via the first routing path. The encapsulated packets of the first traffic flow are forwarded to the second border router via a GRE tunnel.

Additionally, at a first border router, one or more packets of a second traffic flow are received via a routing encapsulation tunnel, wherein the one or more packets of the second traffic flow are encapsulated with a routing encapsulation key. The routing encapsulation key is removed from the one or more packets of the second traffic flow prior to transmission of the received traffic flow via a routing path corresponding to the routing encapsulation key. The packets of the received traffic flow do not have to be reclassified in order to forward the packets along the designated routing path.

Example Embodiments

Figure 1:
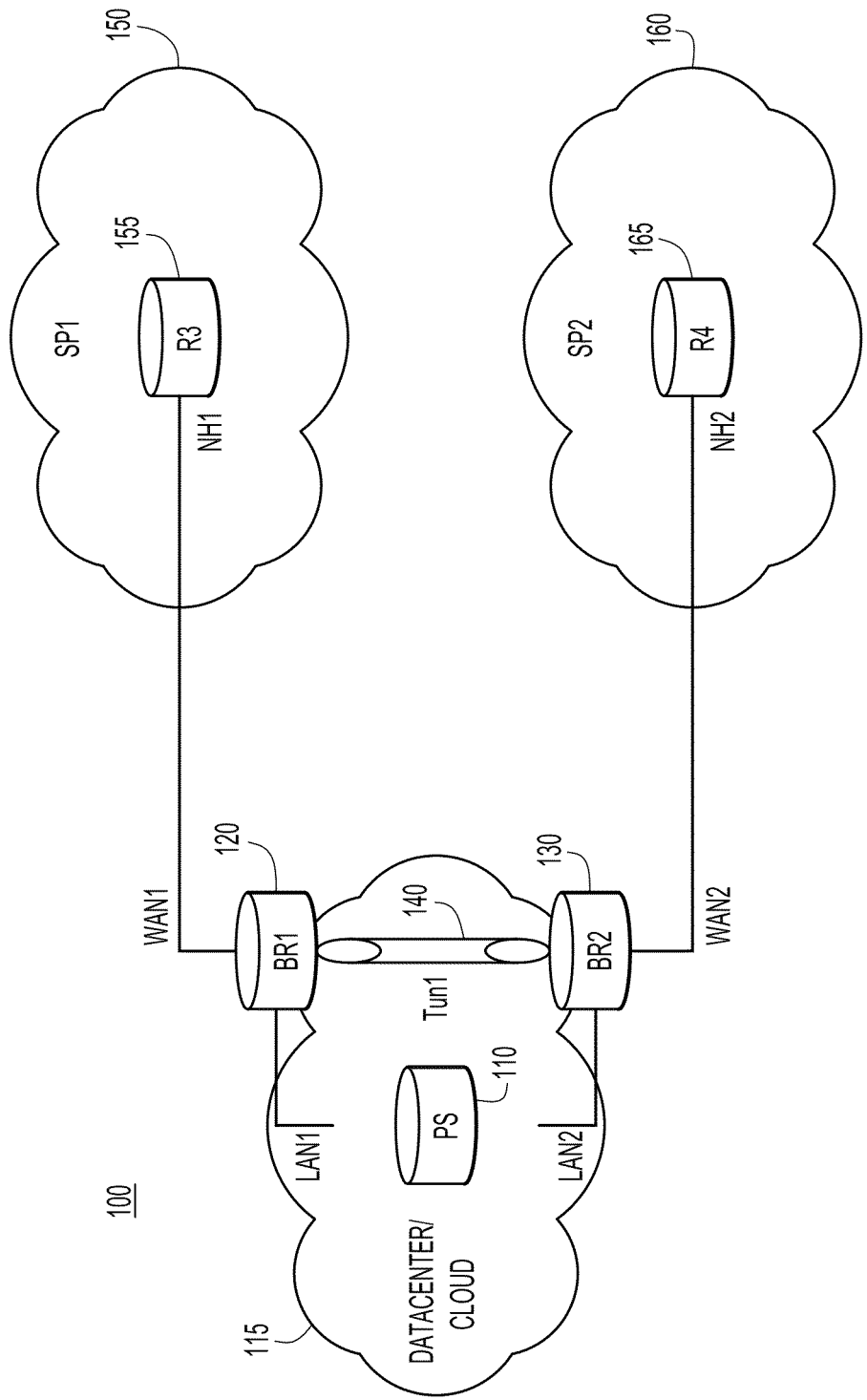
FIG. 1 is an example network topology including a policy server and multiple border routers suitable for implementing the techniques described herein.

Techniques are provided herein for managing traffic flow in a network environment. An example network topology (hereinafter referred to as a "network") 100 is shown in FIG. 1.

A network management device, such as a policy server (PS) 110, monitors data traffic through traffic flow management devices, such as border routers 120, 130. Policy server 110 makes decisions about how individual traffic flows will be routed and stores this information in a routing control table, which is distributed and downloaded to each border router 120, 130 under the control of policy server 110.

Border routers 120,130 typically reside at the boundary of a LAN and a wide area network (WAN), and may perform ingress and egress filtering on traffic flow. While only two border routers are illustrated in FIG. 1 for simplicity, multiple border routers are normally deployed to optimize load sharing and improve failure tolerance.

Although the examples presented herein are shown with only two border routers, the methods, apparatus and techniques easily scale to network topologies having, theoretically, an unlimited number of border routers. Moreover, a border router may be connected pairwise via a single tunnel to each border router in the network or less than the maximum number N of border routers in the network. Additionally, the techniques presented herein could be utilized to effect multi-stage forwarding of traffic flows, such as from a first border router, to one or more intermediate border routers, and finally, to a border router containing the designated WAN exit link.

A traffic flow is an exchange of packets between a source address (e.g., a client) and a destination address (e.g., a server). Packets are generally organized into traffic flows by examining the source and destination addresses together with the source and destination port numbers (according to protocol) of the packets.

One or more border routers 120,130 may receive traffic from one or more local area networks (LANs) of the datacenter/cloud 115, or from other border routers (not shown). In FIG. 1, in order to redirect a traffic flow incoming to the first border router, also referred to as the "anchoring" border router, to a second border router, also referred to as the "forwarding" border router, a tunnel 140 is set up between the two border routers 120, 130, and traffic is forwarded based upon the routing control tables provided by policy server 110. The local area networks (LAN1, LAN2) are interfaces facing the inside of the cloud, and the wide area networks (WAN1, WAN2) are interfaces facing the network of the service provider (SP1, SP2). In this example, router (R3) 155 directs traffic inside of the service provider (SP1) 150 network and router (R4) 165 directs traffic inside of the service provider (SP2) 160 network.

Policy server 110 manages traffic flow within a data center or cloud-based environment 115 by determining how individual traffic flows will be routed. For example, in FIG. 1, policy server 110 monitors the performance characteristics of traffic flows and WAN exit link usage through WAN interfaces (WAN1, WAN2) reported by each border router (BR1, BR2) 120, 130 under its control. Based upon this information, policy server 110 creates routing policies by making routing control decisions to optimize traffic flow. The policy server then stores this information (i.e., routing paths) in a routing control table, which is downloaded to each border router 120, 130 under its control. For an individual traffic flow, policy server 110 may instruct a border router to redirect its packets to another border router for better overall network performance.

To effectively manage traffic flow, the policy server will need to adjust routing decisions periodically, by reconfiguring the routing control table and downloading updated policies to each border router 120, 130. For instance, a traffic flow originally directed to a border router may need to be redirected to a different border router, in the event that the policy server detects that the performance of a particular traffic flow over a routing path drops below a pre-defined policy, causing an "Out Of Policy" error.

Depending on the manner in which updates are distributed, such updates may cause loss of application recognition or visibility, formation of traffic loops, and duplicated processing.

Figure 2A:
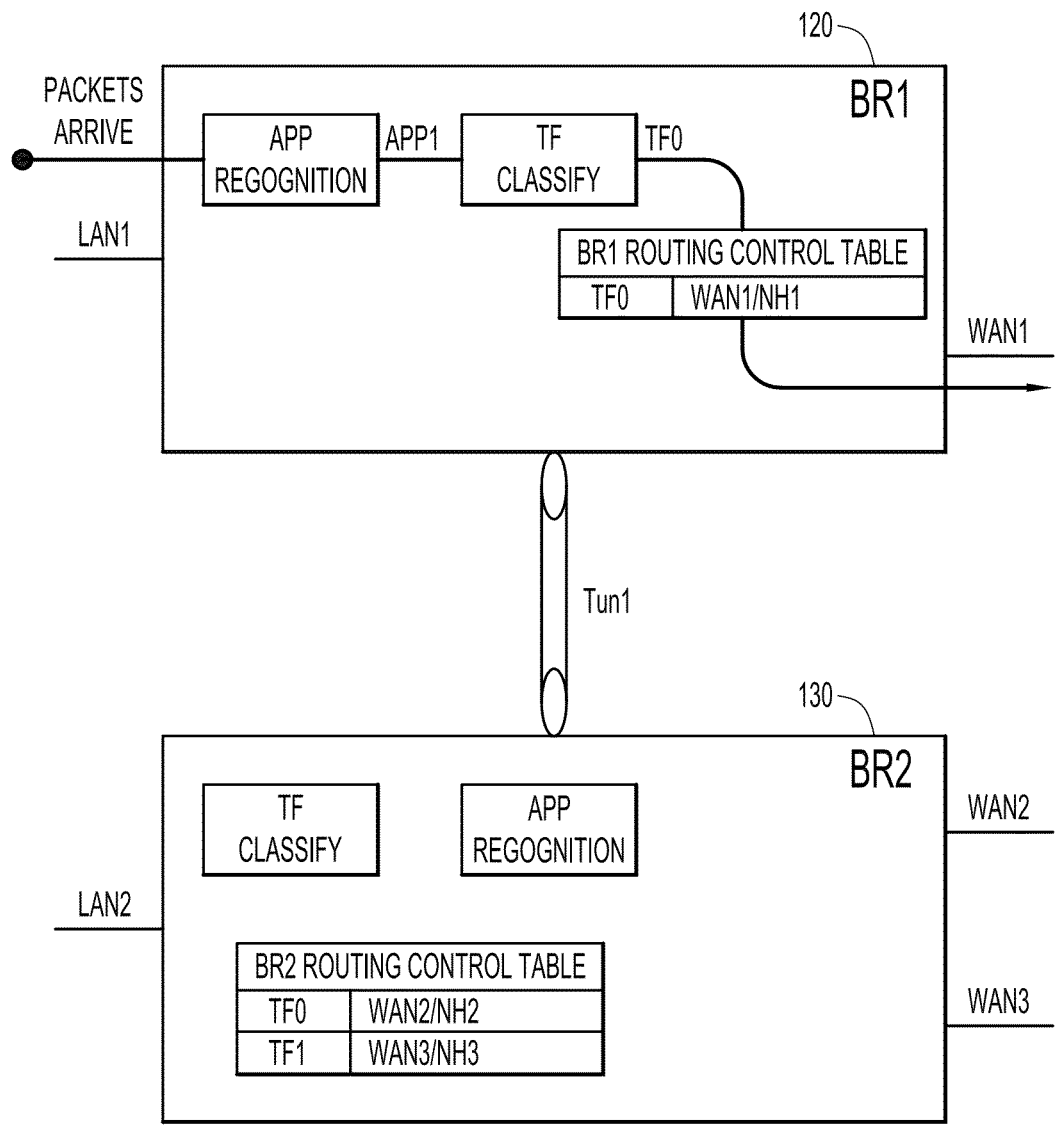
FIG. 2A illustrates traffic flow through a border router based upon a routing control table.

Referring to FIG. 2A, one or more packets of a traffic flow arrive from local area network at a border router and undergo application recognition and classification. Traffic flows may be classified based upon layer 3 and layer 4 information (L3/L4 information associated with the Open Systems Interconnection (OSI) model), as well as with software that performs application recognition, such as Network Based Application Recognition (NBAR). Based upon the instructions in the routing control table, the traffic flow is forwarded along a designated route.

In particular, one or more packets arrive from LAN (LAN1), to undergo application recognition and traffic flow classification and, in this example, become classified as traffic flow (TF0) at border router (BR1) 120. Based upon the instructions provided by the routing control table, traffic flow (TF0) is forwarded to nexthop (NH1) via wide area network exit link (WAN1). In this case, because border router (BR1) directly interfaces with wide area network exit link (WAN1), the traffic flow does not need to undergo redirection (i.e., to be forwarded to any other border router, such as border router (BR2) 130) in order to be forwarded along a designated route.

Figure 2B:
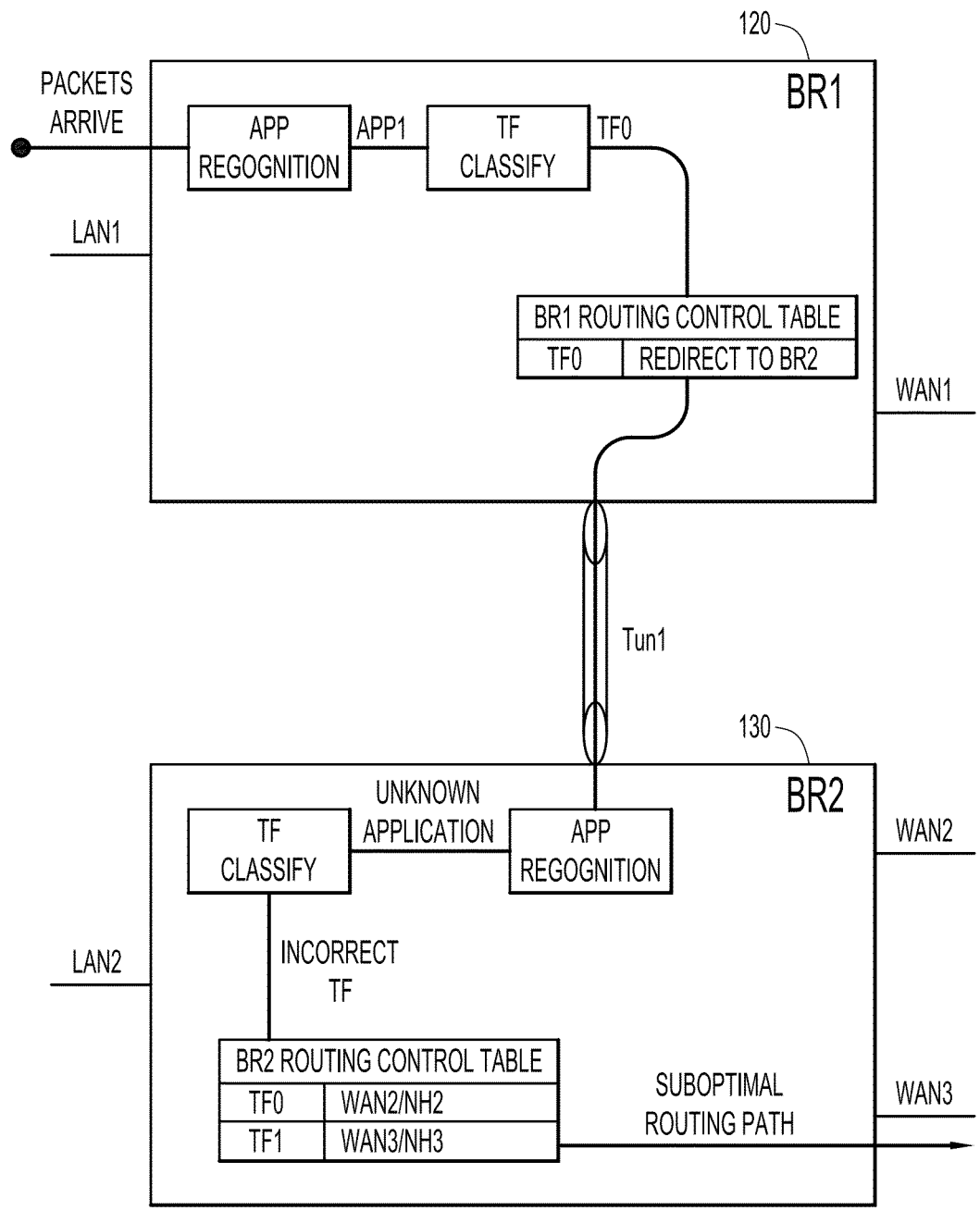
FIG. 2B demonstrates misclassification of a forwarded traffic flow due to loss of application visibility.

Referring to FIG. 2B, loss of application visibility may occur in the event that a traffic flow is redirected from an anchoring border router (BR1) 120 to a forwarding border router (BR2) 130 during the middle of a traffic flow, as the forwarding border router (BR2) 130 may not be able to correctly classify the forwarded traffic flow.

Referring back to FIG. 2A, a new traffic flow undergoes application recognition and classification at border router (BR1) 120, and is recognized as traffic flow (TF0). According to the initial routing control table of border router (BR1), traffic flow (TF0) is to be forwarded to nexthop (NH1) via routing path (WAN1/NH1). However, if policy server 110 detects that the performance of traffic flow (TF0) over routing path (WAN1/NH1) drops below a pre-defined policy to cause an "Out of Policy" error, policy server 110 issues a new routing control table with an updated policy as shown in FIG. 2B. In this case, a new routing path (WAN2/NH2) is assigned for traffic flow (TF0), which instructs border router (BR1) 120 to redirect traffic flow (TF0) to border router (BR2) 130.

In some instances, application recognition technology may need to process multiple packets in order to classify the traffic flow correctly. If a flow is transferred to another border router midstream, the forwarding border router may not have enough information to correctly classify the traffic flow, as it did not receive one or more initial packets of the traffic flow. In other words, for some types of applications, multiple packets need to be monitored from the beginning of the traffic flow in order to successfully perform recognition. Thus, the forwarding border router may lose application visibility and be unable to make a proper routing decision. In the scenario depicted in FIG. 2B, the forwarded traffic flow is not properly recognized (i.e., unknown application) and is incorrectly classified. Thus, because of this defect in application recognition, border router (BR2) 130 chooses a suboptimal path, and accordingly, path optimization based on application performance cannot be successfully performed.

It is also appreciated that the terms "anchoring" and "forwarding" are assigned based upon functionality. In other words, if a traffic flow is being forwarded from border router (BR2) to border router (BR1), then border router (BR2) would be the "anchoring" border router and border router (BR1) would be the "forwarding" border router. The "anchoring" border router initially processes incoming packets from new traffic flows.

Figure 2C:
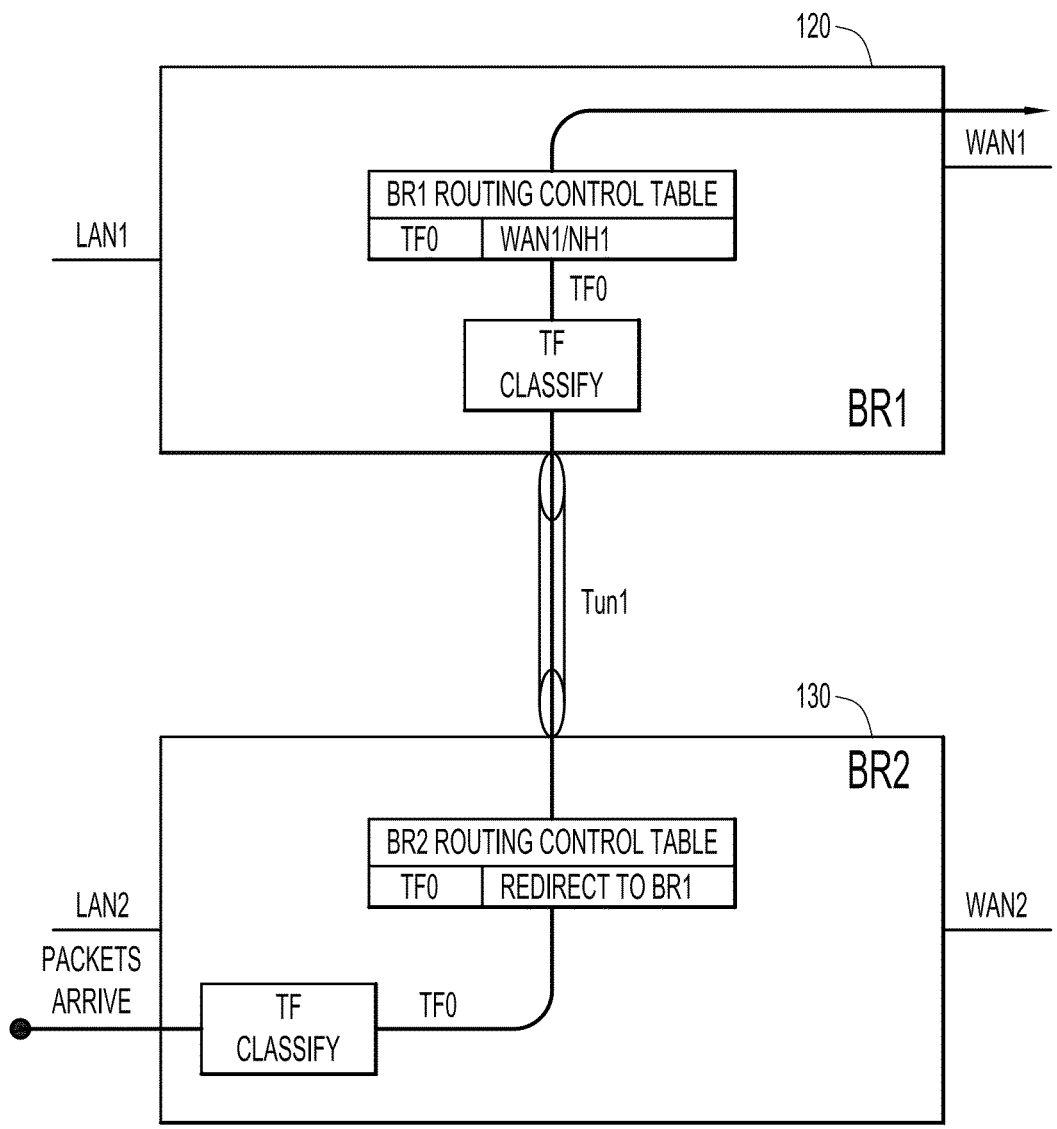
FIG. 2C shows redundant processing of a forwarded traffic flow.

FIG. 2C depicts an example of processing effort duplication at the forwarding border router, in this case border router (BR1) 120. When a forwarding border router receives a redirected traffic flow, it repeats traffic flow classification, application recognition and processing associated with routing control. All of these actions have been previously performed at the anchoring border router, in this case border router (BR2) 130.

Figure 2D:
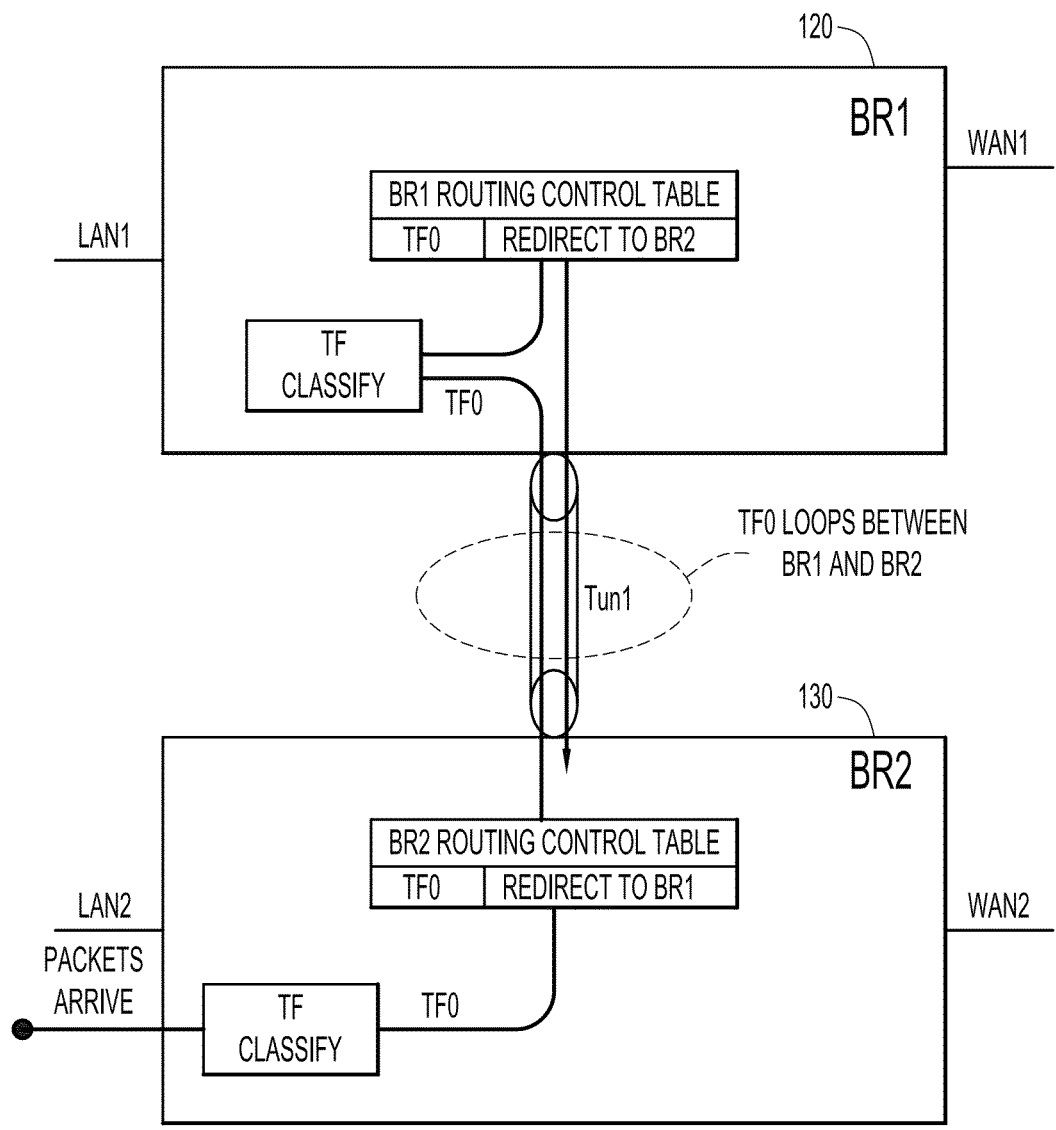
FIG. 2D illustrates formation of a traffic loop between an anchoring and a forwarding border router.

FIG. 2D illustrates formation of a traffic loop in response to an anchoring border router receiving and implementing a traffic routing change prior to a forwarding border router receiving and implementing a routing update.

For example, policy server 110 may initially choose a routing path (WAN1/NH1) for traffic flow (TF0), meaning that border router (BR1) 120 forwards traffic flow (TF0) to nexthop (NH1) via exit link (WAN1). Similarly, border router (BR2) 130 forwards packets of traffic flow (TF0) to border router (BR1) 120.

In the event that an Out of Policy error occurs, a routing configuration change may be made by policy server 110, in which case a new routing path (i.e., WAN2/NH2) is selected for traffic flow (TF0). Thus, the routing control table is variable to reflect routing changes. If border router (BR1) 120 receives and implements the updated routing control table before border router (BR2) 130, then traffic flow (TF0) could cycle between the two border routers until border router (BR2) 130 completes the update.

The methods, apparatus and software described herein utilize a technique that employs a routing encapsulation key and a binding table to regulate traffic flow and avoid the aforementioned rerouting issues. The binding table is created by the policy server and distributed to each border router under its control. For incoming traffic, an anchoring border router determines whether redirection is needed. In the event that packets of a traffic flow are to be redirected to a forwarding border router, the packets are encapsulated with a corresponding routing encapsulation key, e.g., a GRE key, and sent through a tunnel, e.g., a GRE tunnel, to the forwarding border router. The forwarding border router receives the redirected packets and forwards the packets out along a routing path determined by the relationship specified between the GRE key and routing path.

In one embodiment, the policy server constructs and maintains a binding table in which each routing encapsulation key (e.g., a unique GRE key extension) is bound with one routing path (e.g., nexthop destination). Thus, the binding table indicates one-to-one correspondences between a plurality of routing encapsulation keys and a respective plurality of routing paths. The policy server propagates this binding table to each border router (BR) under its control. Because the binding between a routing encapsulation key and a routing path depends only on network topology, changes in the routing table do not affect the binding table. Thus, as a result of the binding table's invariance, the binding table is able to provide stability and consistency with regard to traffic flow management.

In the event that a change in network topology occurs, the binding table will be updated. Changes in network topology include adding or subtracting service providers, adding or subtracting corresponding nexthop routing paths, as well as adding or subtracting additional border routers to the network.

Figure 3:
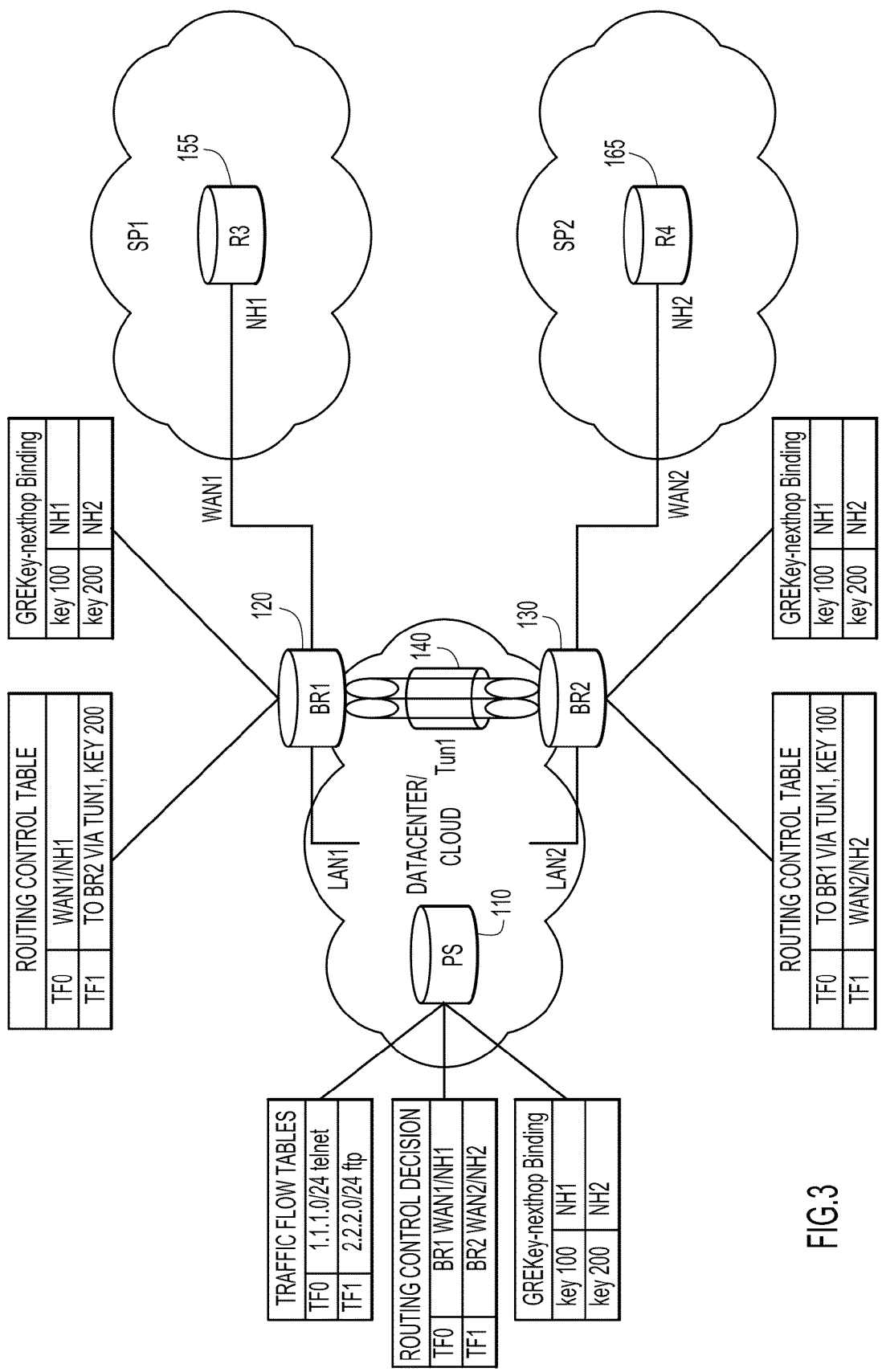
FIG. 3 is an example network topology including a policy server and multiple border routers, according to the techniques disclosed herein.

In FIG. 3, a traffic flow table is provided in which telnet traffic is classified as traffic flow (TF0) and ftp traffic is classified as traffic flow (TF1). The techniques provided herein are not limited to any particular type of traffic flow, and are intended to be broadly applied to traffic flows in general.

Referring again to FIG. 3, policy server 110 decides that traffic flow (TF0) will be routed to nexthop (NH1) via border router (BR1) 120. Similarly, traffic flow (TF1) will be routed to nexthop (NH2) via border router (BR2) 130. Policy server 110 propagates routing control tables containing routing control decisions to each border router 120,130 under its control. Thus, the routing control table for border router (BR2) 130 provides instructions that direct traffic flow TF0 to BR1 (via GRE tunnel Tun1) and TF1 to NH2 via WAN2; the routing control table for border router (BR1) 120 provides instructions that direct traffic flow (TF0) to NH1 via exit link WAN1 and TF1 to BR2 (via GRE tunnel Tun1). Nexthop (NH1) and router (R3) 155 reside within the service provider (SP1) network 150. Nexthop (NH2) and router (R4) 165 reside within the service provider (SP2) network 160.

FIG. 3 also shows binding tables, which essentially create a one-to-one correspondence or mapping between GRE keys and routing paths. Notably, the binding table is invariant with routing changes (rerouting) and is the same for each border router under the control of the policy server. Only changes in network topology will cause a change in the binding table. In contrast, the routing table, which is adjusted by policy server 110 with each routing change, varies with routing changes and is different for each border router. The routing control table contains references to the applicable GRE key/tunnel, which is the key link between the routing table and the binding table.

As mentioned previously, a nexthop protocol is used to route traffic. Nexthop associations inform a router of the Internet Protocol (IP) address of the next router along the route to the destination. In some embodiments, the next router is selected based upon physical proximity to the current router.

Generic routing encapsulation (GRE) is a method for routing over an IP network, any network layer protocol over any other network layer protocol, by encapsulating one or more packets with a GRE header. In addition, GRE tunnels can encapsulate multicast data streams for transmission over the Internet. GRE tunneling is accomplished by creating tunnel endpoints that operate on top of existing physical and/or other logical endpoints. Methods for configuring GRE tunnels may be found in, for example, RFC2784. The techniques disclosed herein may also be applied to multipoint generic routing encapsulation (MGRE) to achieve greater scalability. It is further noted that GRE does not provide data security; in order to establish data security, the techniques disclosed herein would need to be combined with a protocol providing data security, such as IPsec. Techniques describing IPsec protocols are described in, for example, RFC6071.

In one embodiment, a binding table is constructed using GRE key extensions, as described in RFC2890. The anchoring border router redirects packets to the forwarding border router through a GRE tunnel, encapsulating the packets with the corresponding GRE key extension. The forwarding border router receives the redirected packets and forwards the traffic flow along the routing path bound with the GRE key extension. In one approach, GRE encapsulation may be removed at the forwarding border router prior to forwarding the packets to the nexthop destination. In another approach, GRE encapsulation may not be removed at the forwarding border router, with the encapsulated packets being forwarded to the nexthop destination.

Figure 4:
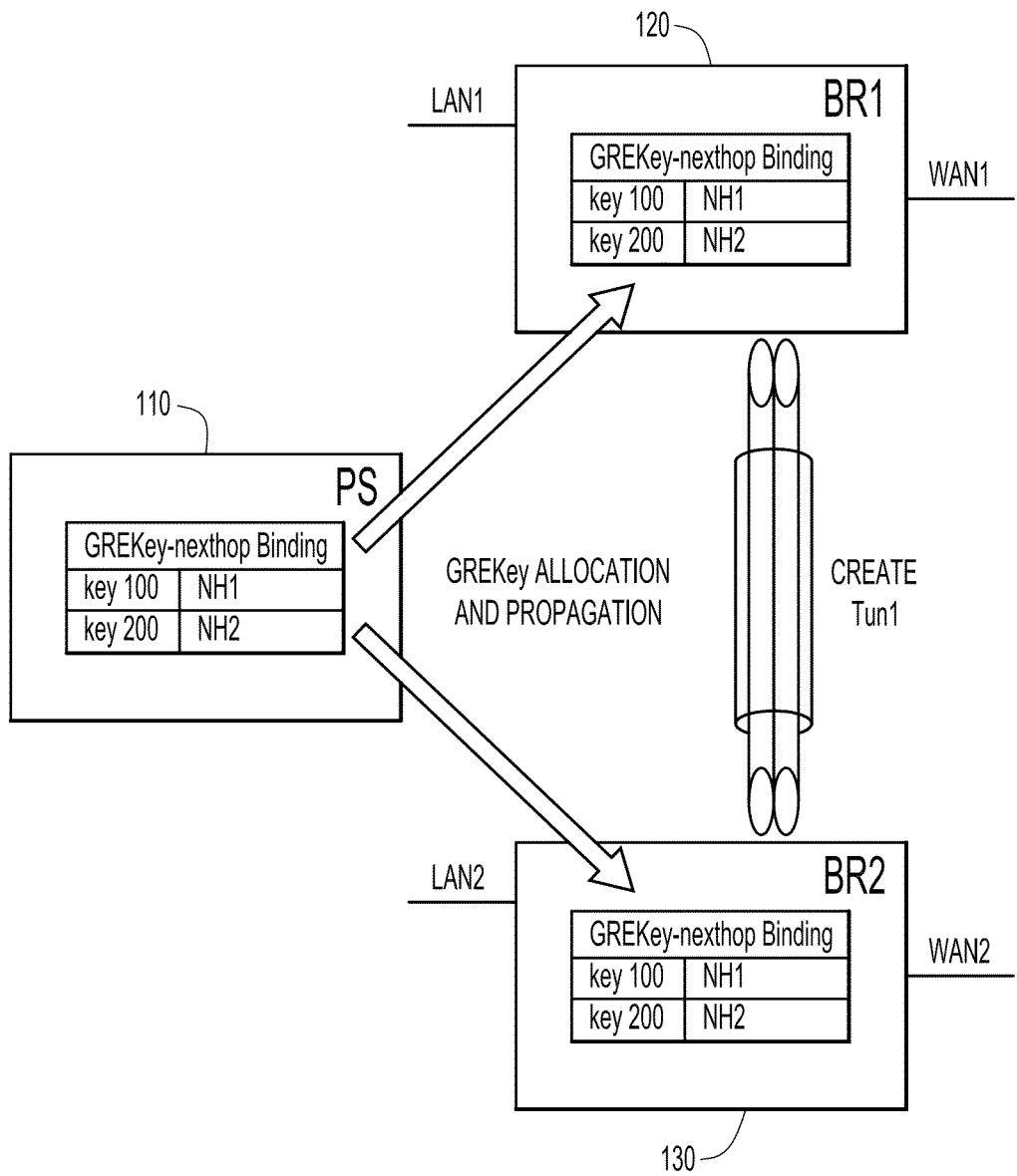
FIG. 4 demonstrates a policy server distributing a routing encapsulation key binding table to each border router under its control, according to the techniques disclosed herein.

FIG. 4 demonstrates that a binding table may be created by policy server 110 and downloaded to each border router 120, 130 under control of policy server 110. In one embodiment, a GRE key is associated with a single nexthop destination. For example, packets comprising a GRE key extension of 100 will be routed to nexthop (NH1), and packets comprising a GRE key extension of 200 will be routed to nexthop (NH2). Importantly, the binding table that is distributed by the policy server to each border router is identical. That is, each border router receives the same binding table. Thus, the binding table is global to a plurality of border routers associated with the policy server.

Figure 5:
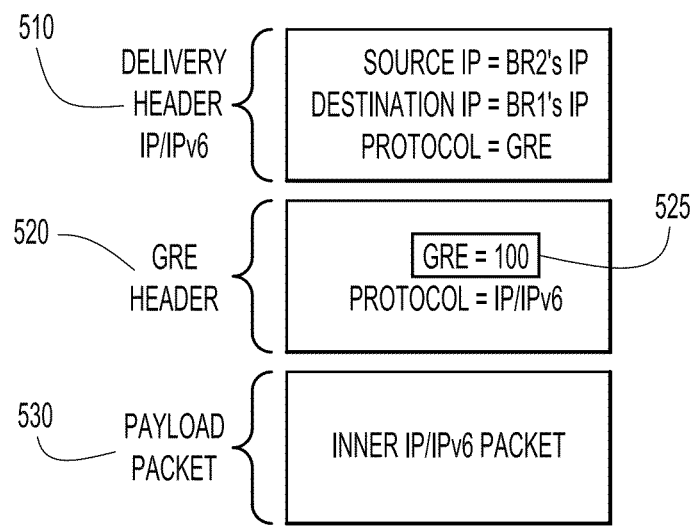
FIG. 5 shows a packet that has been encapsulated according to the techniques described herein.

FIG. 5 shows a packet 500 of a traffic flow encapsulated according to the techniques described herein. The delivery header 510 provides the source IP from which the packet is sent, as well as the destination IP to which the packet is being forwarded. The encapsulation protocol being used (e.g., GRE) is also included in the delivery header 510. The techniques presented herein apply to source and destination IP addresses having IPv4 or IPv6 formats.

The GRE header 520 of the packet includes the GRE key extension 525 assigned to the packet. Upon arrival at a border router, application recognition and classification is performed, and a corresponding routing encapsulation key (i.e., a GRE key extension) 525 is assigned to each packet of the traffic flow. As delivery of the packet is based upon an IP-based protocol, encapsulation of the packet with a corresponding protocol such as GRE that facilitates transport at an IP-based layer is needed. Thus, encapsulating the packets with a routing encapsulation key comprises adding a header to the packets of a traffic flow, wherein the header contains a key identifier that is a generic routing encapsulation (GRE) key extension.

The payload 530 of the packet is also shown. This data is encapsulated using a GRE protocol as disclosed according to the techniques described herein, to facilitate delivery of the packet via a tunnel between an anchoring border router and a forwarding border router.

Figure 6:
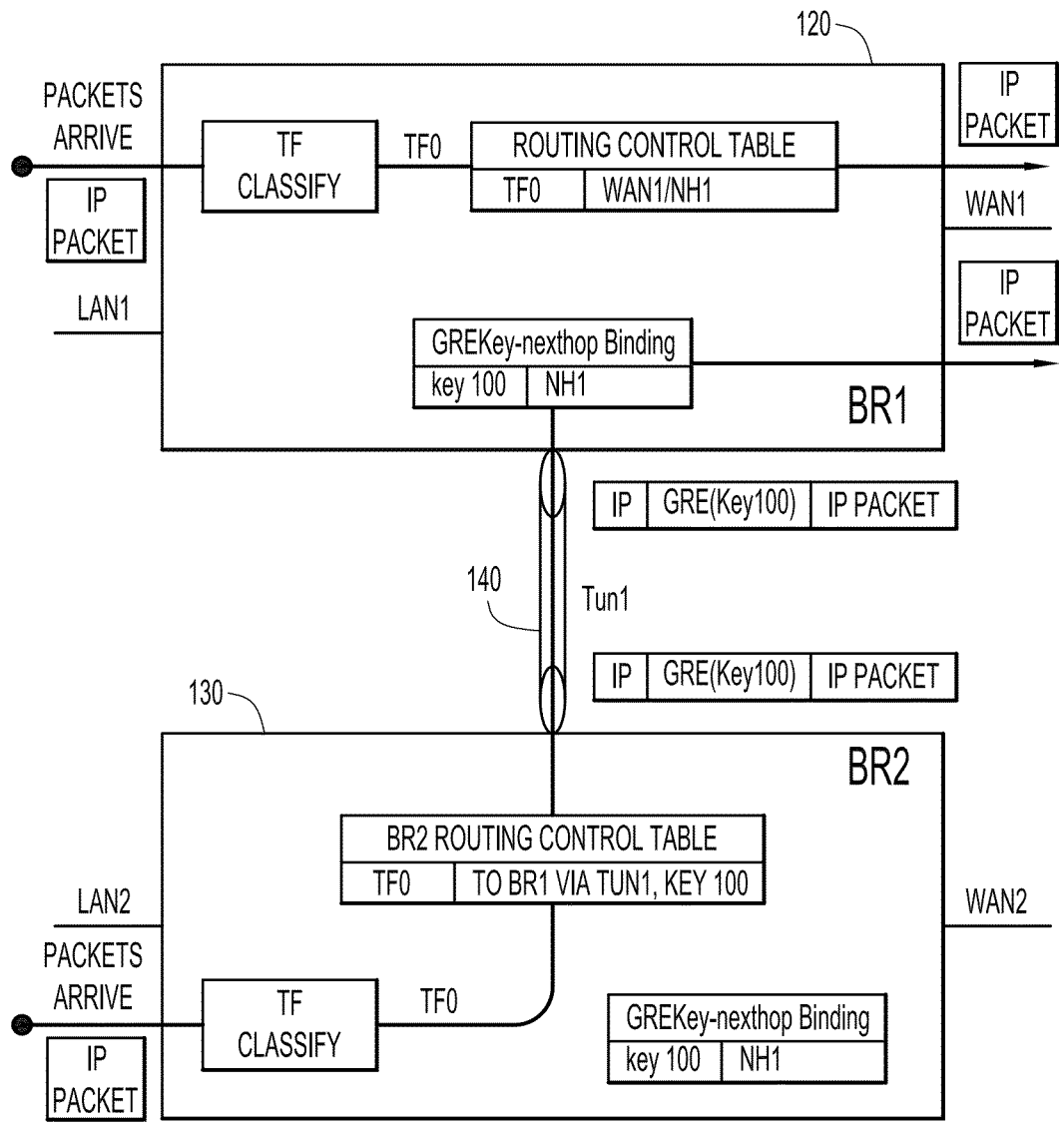
FIG. 6 shows one or more packets of an incoming traffic flow being forwarded from border router (BR2) to border router (BR1) according to the techniques disclosed herein.

An example of traffic flow optimization is provided in FIG. 6. Initially, policy server 110 selects WAN1/NH1 as the routing path for traffic flow (TF0). Thus, if packets arrive at border router (BR1) 120 and are classified as traffic flow (TF0), border router (BR1) forwards the packets of traffic flow (TF0) out of exit link WAN1 to nexthop (NH1). Incoming traffic to border router (BR1) is forwarded to NH1, and does not require GRE encapsulation.

Referring again to FIG. 6, if packets arrive at border router (BR2) 130 and are classified as traffic flow (TF0), the packets will be encapsulated with a GRE header containing a GRE key extension, in this case key 100. According to the routing control table of border router (BR2), packets associated with GRE key extension 100 are delivered to border router (BR1) 120 via tunnel (GRE tunnel Tun1). When border router (BR1) 120 receives the redirected packets from tunnel (Tun1), border router (BR1) 120 retrieves the nexthop (NH1) bound with the GRE key extension (key 100), and forwards the traffic flow out of exit link WAN1 to nexthop NH1 directly, and without performing reclassification or application recognition.

Continuing with the example of FIG. 6, policy server (PS) 110 may issue a routing change (not shown), such that traffic flow (TF0) is now directed to WAN2/NH2 (via border router (BR2)). Thus, incoming traffic to border router (BR2) 130, classified as traffic flow (TF0), will be forwarded to nexthop (NH2) via WAN2 without encapsulation, and incoming traffic to border router (BR1) 120 will be forwarded to border router (BR2) 130 via a GRE tunnel.

For the purposes of this example, the binding table is considered to be static (i.e., invariant with routing control changes commanded by the policy server). That is, regardless of routing control changes, the association of GRE key extension (key 100) with nexthop (NH1), and GRE key extension (key 200) with nexthop (NH2), the latter of which is not shown in FIG. 6, will not change. Thus, a routing encapsulation key statically corresponds to a routing path such that the correspondence between the routing encapsulation key and the routing path is invariant with routing changes.

An updated routing control table is issued to each border router in the network. In the event that border router (BR1) 120 receives a routing control change before border router (BR2) 130, incoming traffic to border router (BR1) 120 classified as traffic flow (TF0) will be encapsulated with GRE key extension (key 200) and forwarded to border router (BR2) 130 via GRE tunnel (Tun1). Once at border router (BR2) 130, received traffic flow will be forwarded based upon the routing path corresponding to the GRE key routing encapsulation, in this case, nexthop (NH2). Incoming packets classified as traffic flow (TF0) at border router (BR2) 130, which has not yet received the routing update, will be encapsulated with GRE key extension (key 100) and forwarded to border router (BR1) 120 via GRE tunnel (Tun1). Upon arrival at border router (BR2) 130, traffic flow (TF0) will be forwarded based upon the path corresponding to the GRE key routing encapsulation, in this case, nexthop (NH1).

Similarly, in the event that border router (BR2) 130 receives and implements a routing control change before border router (BR1) 120, incoming traffic to border router (BR2) 130 classified as traffic flow (TF0) will be forwarded to nexthop (NH2) without encapsulation. Incoming traffic flows (TF0) to border router (BR1) 120, which has not yet implemented the routing update, will be forwarded to next hop (NH1) without encapsulation. Once both border routers have been updated, traffic flow will continue as specified by the routing change.

Thus, in this scenario, a traffic loop (that is, a path in which traffic flow is forwarded from BR1 to BR2, and back again, from BR2 to BR1) cannot occur, because the information provided in the binding table is static, and routing decisions for forwarded traffic at the border routers are governed by the binding table, which sets up an association between a routing encapsulation key and a routing path. In other words, the forwarding border router forwards the redirected packet solely based on GRE key extension-nexthop binding which is governed by a global, static binding table that is unaffected by routing changes. The binding table is not affected by changes in the routing control table, and traffic loops will not form due to distribution and implementation of updates in routing control tables.

Additionally, according to this technique, the forwarding border router does not perform application recognition for the redirected packets, and the issue of loss of application visibility is resolved. Thus, in the event that a traffic flow is redirected midstream, the risk of having an error due to misclassification is eliminated. If a traffic flow is redirected, the receiving border router knows, based upon the association of a particular GRE key extension with a routing path destination, the classification of the received traffic flow.

Further, the forwarding border router does not perform traffic flow classification, application recognition, or processing associated with routing control for the redirected traffic flow, and therefore, the issue of duplicated processing effort at the forwarding border router is resolved. Again, since the forwarding border router selects a routing path for the encapsulated packets received via the GRE tunnel based solely on the identity of the GRE key specified in the encapsulated packets (i.e., by consulting the GREkey-nexthop binding table), there is no need to analyze the packets for application recognition or traffic flow classification, or to consult with the routing control table in order to properly route the encapsulated packets.

Other benefits of the techniques disclosed herein include automated functionality; in other words, manual configuration is not needed. Further, the techniques are flexible, in that other attributes could be associated with the redirected packets to provide additional types of information useful for optimizing traffic flow. Additionally, the topology is easily scalable, as only one tunnel is needed between any two border routers.

The techniques described herein are not limited to any particular network topology. For example, the techniques described herein may be applied to a network having a dynamic multipoint virtual private network (DMVPN) topology, wherein the routing encapsulation key, e.g., the GRE key, corresponds to a peer site spoke in such a transport environment. For a DMVPN topology, a routing control table and a binding table may contain thousands of entries. As another example, the techniques described herein may be applied to a network having a multiprotocol label switching (MPLS) virtual private network (VPN) topology, wherein the routing encapsulation key, e.g., the GRE key, is bound with an adjacent provider edge (PE) in such a transport environment.

Figure 7:
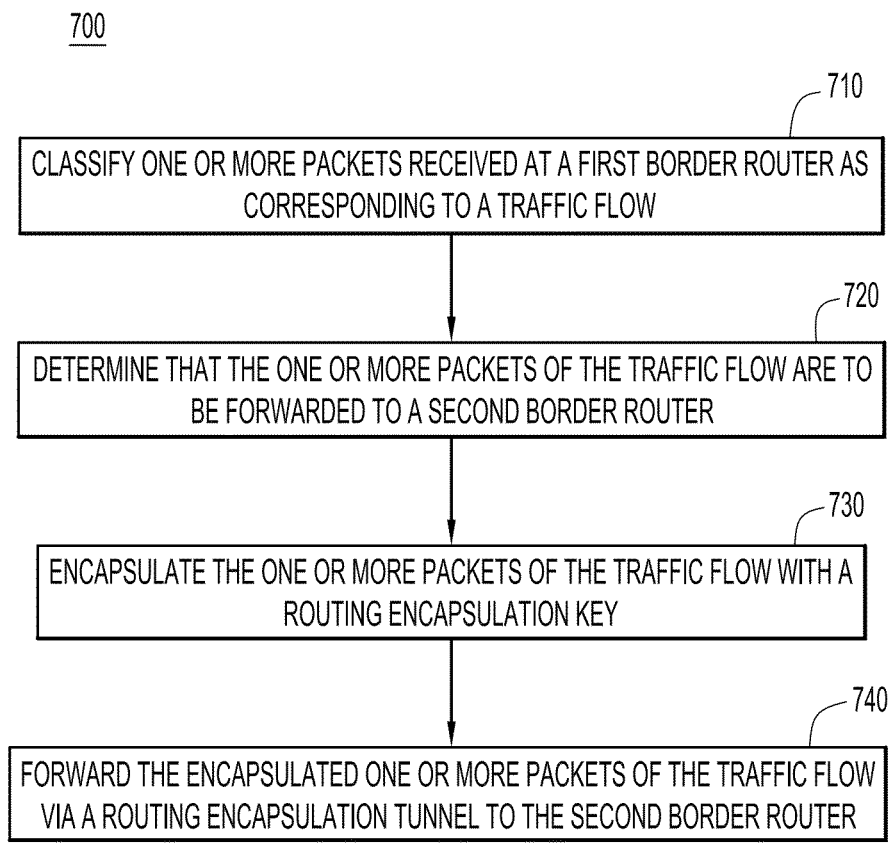
FIG. 7 is a flow chart depicting operations performed by a border router to forward one or more packets of a classified traffic flow to another border router in accordance with the techniques disclosed herein.

FIG. 7 is a flow diagram 700 of the processes according to the techniques disclosed herein. At step 710, a plurality of packets corresponding to a traffic flow is received and classified at a border router as corresponding to a traffic flow. At step 720, the border router determines that the packets of the traffic flow are to be forwarded to a second border router based on a routing control table. At step 730, the packets of the traffic flow are encapsulated with a routing encapsulation key indicated by the routing control table. At step 740, the encapsulated packets of the traffic flow are forwarded via a routing encapsulation tunnel to the second border router.

Figure 8:
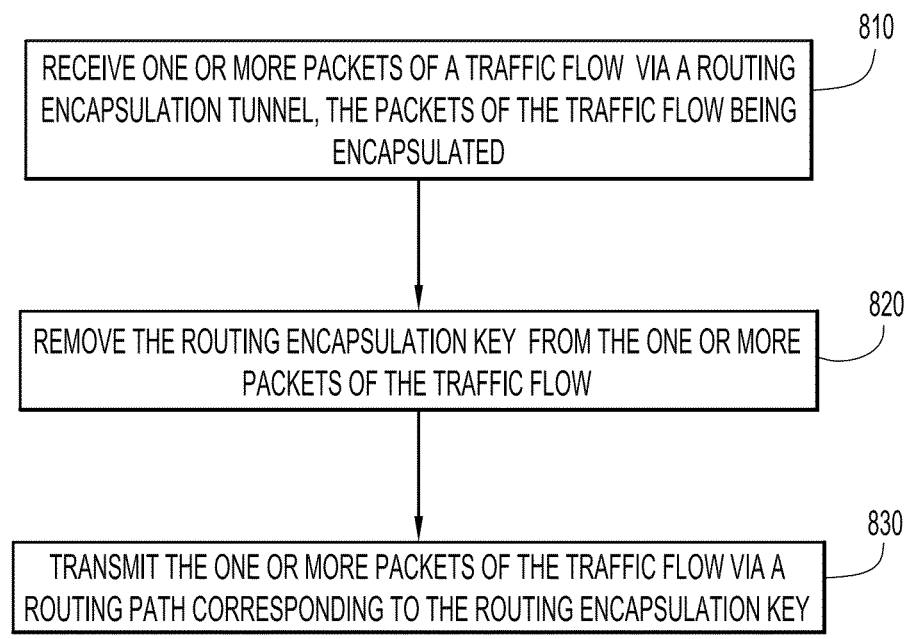
FIG. 8 is a flow chart depicting operations performed by a border router to receive packets of a forwarded traffic flow and transmit the packets via a routing path in accordance with the techniques disclosed herein.

FIG. 8 is a flow diagram 800 of the processes involved according to the techniques disclosed herein. At step 810, an encapsulated traffic flow is received from a first border router, via a routing encapsulation tunnel, the packets of the traffic flow being encapsulated. At step 820, the routing encapsulation key is removed from the packets of the traffic flow. At step 830, the packets of the traffic flow are transmitted via a routing path corresponding to the routing encapsulation key. Additionally, transmittal of the packets of the traffic flow does not require reclassifying the traffic flow. In other words, the received traffic flow is forwarded to a nexthop destination based upon the association in the binding table between the GRE key extension in the header of the packet and the nexthop destination.

Figure 9:
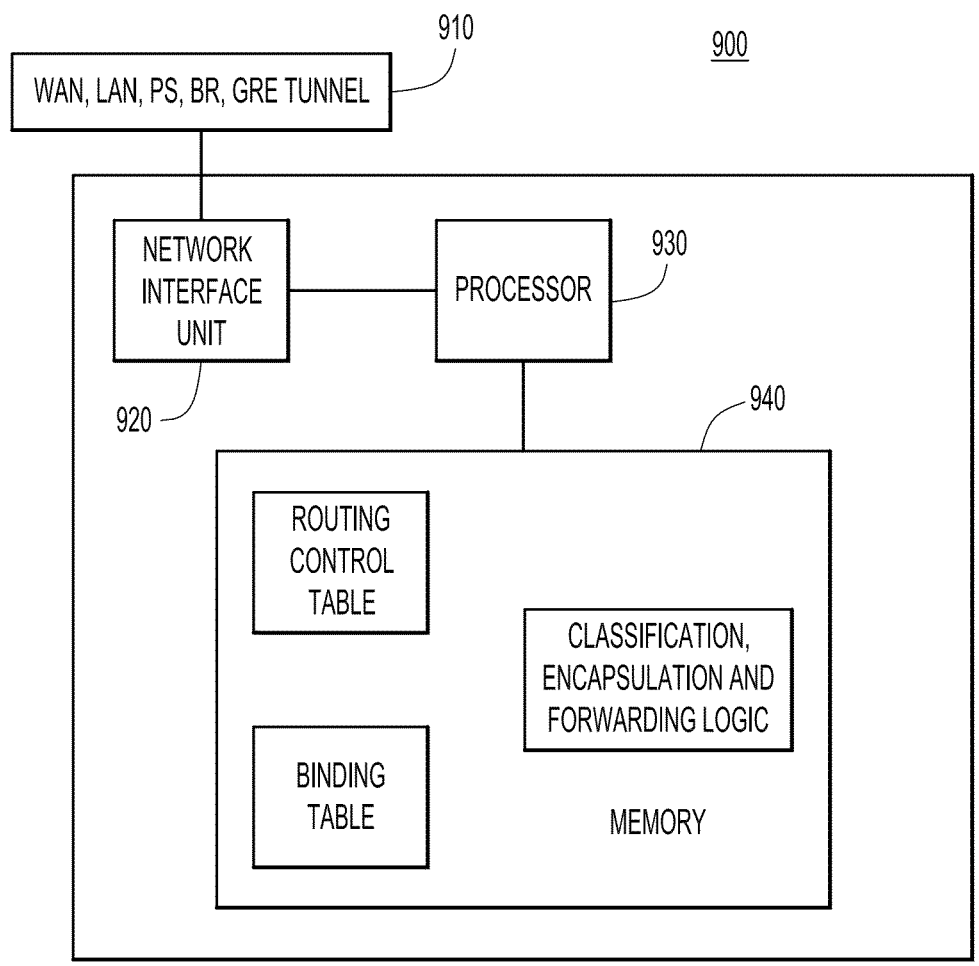
FIG. 9 is a hardware configuration for a border router that forwards and receives packets corresponding to a traffic flow according to the techniques disclosed herein.

FIG. 9 is a hardware implementation 900 of a border router according to the techniques disclosed herein. A network interface card 920 interfaces with a network. A processor 930 executes the application recognition, classification, encapsulation and forwarding software according to the techniques disclosed herein. Both routing control tables and binding tables are stored in memory 940. Various interfaces 910 to which the network interface unit 920 is connected are shown. Such interfaces include LANs, WANs, policy server 110, other border routers and GRE tunnels 140. Thus, while conceptually illustrated as a "network interface unit," it will be appreciated that a border router may contain more than one network interface or type of interface to communicate with other devices within the network.

Memory 940 is one or more computer readable storage media that may comprise read only memory (ROM), random access memory (RAM), magnetic disk storage media devices, optical storage media devices, flash memory devices, electrical, optical, or other physical/tangible memory storage devices. Processor 930 is, for example, a microprocessor or microcontroller that executes instructions for the classification, encapsulation, and forwarding logic 700, 800. Thus, in general, the memory 940 may comprise one or more tangible computer readable storage media (e.g., a memory device) encoded with software comprising computer executable instructions and when the software is executed (by the processor 930) it is operable to perform the operations described herein in connection with the classification, encapsulation, and forwarding logic 700, 800. In other approaches, the binding table and the routing control table are stored in one or more databases accessible by processor 930.

The techniques disclosed herein may be applied to any solution of centralized controlled application performance based WAN path optimization. The techniques described herein may also be used to scan incoming network traffic to identify whether deterministic binding between a GRE key and a routing path is being used.

Although the apparatus, system, and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following claims.

What is claimed is:

1. A method comprising:
   classifying a plurality of packets received at a first border router as corresponding to a first traffic flow of a plurality of traffic flows;
   determining whether the packets of the first traffic flow are to be forwarded to a second border router based on a routing control table that establishes an association between the plurality of traffic flows and respective routing paths;
   in response to determining that the packets of the first traffic flow are to be forwarded to the second border router:
      encapsulating the packets of the first traffic flow with a routing encapsulation key indicated by the routing control table, the routing encapsulation key corresponding to a first routing path; and
      forwarding the encapsulated packets of the first traffic flow via a routing encapsulation tunnel from the first border router to the second border router for transmission via the first routing path;
   receiving, at the first border router, packets of a second traffic flow via the routing encapsulation tunnel, the packets of the second traffic flow being encapsulated with a second routing encapsulation key;
   removing the second routing encapsulation key from the packets of the second traffic flow; and
   transmitting the packets of the second traffic flow via a second routing path corresponding to the second routing encapsulation key without determining at the first border router that the packet of the second traffic flow correspond to the second traffic flow.

2. The method of claim 1, wherein:
   the routing control table is variable to reflect routing changes; and
   the routing encapsulation key statically corresponds to the first routing path such that the correspondence between the routing encapsulation key and the first routing path is invariant with routing changes.

3. The method of claim 1, wherein encapsulating the packets of the first data flow further comprises determining the first routing path from a routing encapsulation key binding table that indicates one-to-one correspondences between a plurality of routing encapsulation keys and a respective plurality of routing paths.

4. The method of claim 3, further comprising receiving the routing encapsulation key binding table at the first border router from a policy server, wherein the routing encapsulation key binding table is global to a plurality of border routers associated with the policy server.

5. The method of claim 1, wherein:
   encapsulating further comprises adding a header to the packets of the first traffic flow, the header containing a key identifier that is a generic routing encapsulation (GRE) key extension; and
   forwarding further comprises forwarding the encapsulated packets of the first traffic flow via a GRE tunnel.

6. The method of claim 1, wherein the routing encapsulation key is bound to an adjacent provider edge (PE) router in a multi protocol label switching (MPLS) virtual private network (VPN) transport environment.

7. The method of claim 1, wherein the routing encapsulation key corresponds to a peer site spoke in a dynamic multipoint virtual private network (DMVPN) transport environment.

8. An apparatus comprising:
   a network interface unit configured to enable communications over a network; and a processor coupled to the network interface unit, and configured to:
  classify a plurality of packets received at the network interface unit as corresponding to a first traffic flow of a plurality of traffic flows;
  determine whether the packets of the first traffic flow are to be forwarded to a forwarding border router based on a routing control table that establishes an association between the plurality of traffic flows and respective routing paths;
  in response to determining that the packets of the first traffic flow are to be forwarded to the forwarding border router:
    encapsulate the packets of the first traffic flow with a routing encapsulation key indicated by the routing control table, the routing encapsulation key corresponding to a first routing path; and
    forward the encapsulated packets of the first traffic flow via a routing encapsulation tunnel to the forwarding border router for transmission via the first routing path;
  receive, at the network interface unit, packets of a second traffic flow via the routing encapsulation tunnel, the packets of the second traffic flow being encapsulated with a second routing encapsulation key;
  remove the second routing encapsulation key from the packets of the second traffic flow; and
  transmit the packets of the second traffic flow via a second routing path corresponding to the second routing encapsulation key without determining by the processor that the packets of the second traffic flow correspond to the second traffic flow.

9. The apparatus of claim 8, wherein the processor is further configured to encapsulate the packets of the first data flow by determining the first routing path from a routing encapsulation key binding table that indicates one-to-one correspondences between a plurality of routing encapsulation keys and a respective plurality of routing paths.

10. The apparatus of claim 9, wherein the processor is further configured to receive, via the network interface unit, the routing encapsulation key binding table from a policy server, wherein the routing encapsulation key binding table is global to a plurality of border routers associated with the policy server.

11. The apparatus of claim 8, wherein the processor is further configured to encapsulate one or more packets by adding a header to the packets of the first traffic flow, the header containing a key identifier that is a generic routing encapsulation (GRE) key extension; and
  forward the encapsulated packets of the first traffic flow via a GRE tunnel.

12. The apparatus of claim 8, wherein the processor is further configured to:
  receive an update to the routing control table that assigns a new routing path to the first traffic flow; and
  transmit the packets of the first traffic flow based upon the updated routing control table without forwarding them to the forwarding border router.

13. One or more computer readable storage media encoded with software comprising computer executable instructions and when the software is executed operable to:
  classify a plurality of packets received at a first border router as corresponding to a first traffic flow of a plurality of traffic flows;
  determine whether the packets of the first traffic flow are to be forwarded to a second border router based on a routing control table that establishes an association between the plurality of traffic flows and respective routing paths;
  in response to a determination that the packets of the first traffic flow are to be forwarded to the second border router:
    encapsulate the packets of the first traffic flow with a routing encapsulation key indicated by the routing control table, the routing encapsulation key corresponding to a first routing path; and
    forward the encapsulated packets of the first traffic flow via a routing encapsulation tunnel from the first border router to the second border router for transmission via the first routing path
  receive, at the first border router, packets of a second traffic flow via the routing encapsulation tunnel, the packets of the second traffic flow being encapsulated with a second routing encapsulation key;
  remove the second routing encapsulation key from the packets of the second traffic flow; and
  transmit the packets of the second traffic flow via a second routing path corresponding to the second routing encapsulation key without determining at the first border router that the packets of the second traffic flow correspond to the second traffic flow.

14. The computer readable storage media of claim 13, wherein the instructions to encapsulate the packets further comprise instructions operable to:
  determine the first routing path from a routing encapsulation key binding table that indicates one-to-one correspondences between a plurality of routing encapsulation keys and a respective plurality of routing paths.

15. The computer readable storage media of claim 14, further comprising instructions operable to receive the routing encapsulation key binding table at the first border router from a policy server, wherein the routing encapsulation key binding table is global to a plurality of border routers associated with the policy server.

16. The computer readable storage media of claim 13, wherein the instructions to encapsulate the packets further comprise instructions operable to:
  add a header to the packets of the first traffic flow, the header containing a key identifier that is a generic routing encapsulation (GRE) key extension; and
  forward the encapsulated packets of the first traffic flow via a GRE tunnel.

17. The non-transitory computer readable storage media of claim 13, further comprising instructions operable to:
  receive an update to the routing control table that assigns a new routing path to the first traffic flow; and
  transmit the packets of the first traffic flow based upon the updated routing control table without forwarding them to the second border router.

18. The method of claim 1, further comprising:
  receiving an update to the routing control table that assigns a new routing path to the first traffic flow; and
  transmitting the packets of the first traffic flow based upon the updated routing control table without forwarding them to the second border router.

19. The apparatus of claim 9, wherein the routing encapsulation key is bound to an adjacent provider edge (PE) router in a multi protocol label switching (MPLS) virtual private network (VPN) transport environment or corresponds to a peer site spoke in a dynamic multipoint virtual private network (DMVPN) transport environment.

20. The non-transitory computer readable storage media of claim 13, wherein the routing encapsulation key is bound to an adjacent provider edge (PE) router in a multi protocol label switching (MPLS) virtual private network (VPN) transport environment or corresponds to a peer site spoke in a dynamic multipoint virtual private network (DMVPN) transport environment.

* * * * *